[54] PROCESS FOR PREPARING 2,4,4,4-TETRACHLOROBUTANOL

[75] Inventors: Donald W. Kaiser, Hamden; Craig K. Wood, North Haven, both of Conn.

[73] Assignee: Olin Corporation, New Haven, Conn.

[22] Filed: Dec. 21, 1970

[21] Appl. No.: 100,351

[52] U.S. Cl.................................................260/633
[51] Int. Cl..............................................C07c 31/34
[58] Field of Search..........................260/633, 658 C

[56] References Cited

UNITED STATES PATENTS

| 3,399,241 | 8/1968 | Smith | 260/633 |
| 3,399,217 | 8/1968 | Zaslowsky | 260/633 |
| 3,309,393 | 3/1967 | Nakagawa et al | 260/658 C |

FOREIGN PATENTS OR APPLICATIONS 1,207,366  12/1965  Germany..............................260/633

OTHER PUBLICATIONS

Le Coq et al., C. R. Acad. Sc. Paris, Series C, t264, pp. 1200–1203, 1967.

*Primary Examiner*—Howard T. Mars
*Attorney*—F. A. Iskander, Gordon D. Byrkit, Donald F. Clements, Thomas P. O'Day and E. Zagarella

[57] ABSTRACT

Carbon tetrachloride and allyl alcohol are reacted, in the presence of an improved catalyst system comprised of iron powder, iron chloride and a free radical generating azo compound, to obtain 2,4,4,4-tetrachlorobutanol in high yield and purity. The resulting chlorinated alcohol product is of utility in preparing 4,4,4-trichlorobutylene oxide which in turn is a useful intermediate in the preparation of chlorinated polyether polyols employed in making flame-retardant polyurethane foam.

10 Claims, No Drawings

PROCESS FOR PREPARING 2,4,4,4-TETRACHLOROBUTANOL

This invention relates to an improved process for making 2,4,4,4-tetrachlorobutanol. More particularly, the invention relates to a novel catalyst system for use in the preparation of 2,4,4,4-tetrachlorobutanol by the reaction of allyl alcohol with carbon tetrachloride.

The compound 2,4,4,4-tetrachlorobutanol, hereinafter referred to as TCBA, is a versatile chemical having a wide range of utility. It reacts in a manner typical of aliphatic alcohols, and its chlorinated nature renders it highly desirable where high chlorine content is needed, for example, as a component of pesticides in agricultural applications and the like. It is also useful as an intermediate in preparing plasticizers for polyvinyl chloride resins. In addition, TCBA may readily be dehydrohalogenated to give 4,4,4-trichlorobutylene oxide. This latter compound is a reactive, high chlorine-containing epoxide which is useful in the preparation of epoxy resins, lubricants, and chlorinated polyether polyols employed in the preparation of flame-retardant polyurethane foam.

U.S. Pat. No. 3,399,217 to Zaslowsky and U.S. Pat. No. 3,399,241 to Smith disclose improved processes for making TCBA by the reaction of allyl alcohol with carbon tetrachloride. The Smith patent utilizes a reaction catalyst mixture comprised of powdered iron and anhydrous ferric chloride, and the catalyst mixture utilized in the Zaslowsky patent comprises, along with the powdered iron and the ferric chloride, calcium carbonate and magnesium sulfate. These patents eliminate prior art drawbacks such as the need to use high reaction temperatures and high pressure equipment. However, there is still a need for a catalyst system for the reaction of allyl alcohol with carbon tetrachloride, which provides higher yields of TCBA.

LeCoq and Levas, in C.R. Acad. Sci., Paris, France, Ser. C264(14), 1967 pp. 1200–1203, disclose the use of azobisisobutyronitrile as a catalyst in the reaction of allyl alcohol with trichlorobromomethane to obtain good yields of trichlorobromobutanol. However, when this catalyst is employed in the reaction of allyl alcohol with carbon tetrachloride, a very low conversion to TCBA is obtained.

Now it has been found, in accordance with this invention, that TCBA, in improved purity and yield, can be prepared by carrying out the reaction of allyl alcohol with carbon tetrachloride in the presence of a catalytic proportion of a catalyst mixture comprised of iron powder, iron chloride and a free radical generating, azo compound.

In the reaction of allyl alcohol with carbon tetrachloride, any suitable molar ratio of allyl alcohol to carbon tetrachloride, ranging from about 1:1 to about 1:6, and preferably from about 1:2 to about 1:4, may be employed.

Any type of iron can be employed as a catalyst component according to the invention, for example elemental iron, wrought iron, stainless steel, mixtures thereof, and the like. The iron is employed in powdered form, usually comprising particles all of which pass a 40-mesh screen and preferably all of which pass a 200-mesh screen. Particles having a diameter larger than about 40-mesh may be employed, but the catalytic effect of these larger particles is reduced inasmuch as their total surface area is smaller.

The iron chloride component of the catalyst mixture is preferably employed in the anhydrous, sublimed powder form. It can be ferrous chloride or ferric chloride, the ferric chloride being preferred.

Any free radical producing, azo compound may be employed as a component in the catalyst mixture of the invention. Illustrative are azobisisobutyronitrile, azobisformamide, azodicarbonamide, and the like. Such compounds upon exposure to heat, lose nitrogen and generate free radicals. However, it is preferred to use azobisisobutyronitrile. This is a solid material which can be purchased commercially. It can be employed in its commercially available state.

Typical relative ranges, and preferred relative ranges, of the components of the catalyst mixture employed according to the invention are provided in Table 1 below.

TABLE I

| Catalyst Component | Typical Proportion Range (% by weight) | Preferred Proportion Range (% by weight) |
|---|---|---|
| Iron powder | about 1 – 60 | about 10 – 40 |
| Iron chloride | about 0.5 – 60 | about 5 – 40 |
| Free radical generating azo compound | about 1 – 75 | about 10 – 60 |

The catalyst mixture is employed in any catalytic proportion that is capable of increasing the reaction rate of the allyl alcohol with the carbon tetrachloride. Thus, based on the total weight of allyl alcohol and carbon tetrachloride, a proportion of the catalyst mixture usually ranging from about 0.5 percent to about 25 percent by weight, and preferably from about 1 percent to about 10 percent may be employed.

Any convenient order of mixing of the reactants and the catalyst components may be employed. For example, all of the reactants and the catalyst components may be added simultaneously to a reactor, and the reactor contents may then be agitated and heated, under reflux, until the reaction has attained the desired degree of completion. However, it is preferred to add the carbon tetrachloride and the individual catalyst mixture components to the reactor first. These are then heated, and the allyl alcohol is added to the agitated mixture incrementally over a period of time.

After the reactants and catalytic mixture have been added to the reactor, the agitated reaction mass is heated, preferably under reflux and a nitrogen blanket, at a temperature range of about 70°–95° C., and preferably about 72°–90° C. for the length of time that is necessary to achieve complete reaction of all the allyl alcohol with the carbon tetrachloride. Usually the total reaction time ranges from about 4 to about 15 hours, and preferably from about 5 to about 8 hours, but shorter or longer time periods may be employed if desired.

After the refluxing step has been completed, during which time hydrogen chloride and water are formed in side reactions as minor by-products, and organic phase, containing carbon tetrachloride and TCBA, is separated, cooled and the solids are removed therefrom by filtration or other convenient solid-liquid separation technique. The solids are formed from unused catalysts or reaction products of the catalyst. The resulting filter cake is washed with carbon tetrachloride and then discarded, the carbon tetrachloride wash being added to the filtrate. The filtrate and wash solution are combined and washed with water to remove any dissolved inorganic salts and trapped, unused catalyst. The aqueous phase is then separated from the organic phase, which, if desired, may be stripped, using a flash evaporator. The purpose of the stripping step is to remove carbon tetrachloride and possibly smaller proportions of other volatiles such as allyl alcohol, and to enable the recovery of the TCBA in high concentrations.

As indicated above, the product TCBA, by virtue of its high chlorine content, can be used as a component of pesticides in agricultural and like applications. It is also useful, when reacted with a basic dehydrohalogenation agent, in preparing 4,4,4-trichlorobutylene oxide which in turn is of utility in preparing epoxy resins, lubricants, and chlorinated polyether polyols which are employed in the preparation of flame-retardant poly-urethane foam. When used to prepare trichlorobutylene oxide, the crude organic phase of TCBA, prepared as described above, can be used directly, without stripping off its volatile components.

In a preferred embodiment of the invention, the catalyst mixture also comprises a certain proportion of calcium carbonate. Typically this may range from about 1 to about 75 percent, and preferably from about 10 to about 40 percent, by weight based on the total weight of the catalyst mixture.

It is also preferred to include in the catalyst mixture varying proportions of an anti-oxidant. Illustrative anti-oxidants are butylated hydroxyanisole, butylated hydroxytoluene, 2,2'-methylene-bis-4-methyl-6-tertia-rybutylphenol, and the like. The butylated hydroxyanisole is particularly preferred. Any effective proportion of the anti-oxidant may be employed such as about 0.5–20 percent, and preferably 1–10 percent, by weight based on the total weight of the catalyst mixture. Surprisingly, the inclusion of an antioxidant, which is known to destroy free radicals, has been found to further increase the yield of TCBA product.

By utilizing the catalyst mixture of the invention full conversion of the allyl alcohol and an improved yield and purity of the product TCBA can be obtained. Typically, yields as high as about 80–90 percent are obtained and the purity of the product TCBA exceeds 80 percent. These results are particularly surprising in view of the fact that but for the presence of the azo compound, e.g., azobisisobutyronitrile, in the catalyst mixture, such yields would be unobtainable. Yet if this azo compound is used in the absence of the iron and the iron chloride, a very low conversion to TCBA results.

The following examples are provided to illustrate the invention. In these examples, all parts and percentages are by weight unless otherwise specified.

EXAMPLE 1

Into a three-necked, round-bottomed flask equipped with a magnetic stirrer, a reflux condenser, a thermometer, and an addition funnel, there were charged 462 grams (3 moles) of carbon tetrachloride, 5.2 grams of azobisisobutyronitrile, 2.6 grams of iron powder, 1.3 grams of anhydrous ferric chloride, and 5.2 grams of calcium carbonate. Under a nitrogen blanket, the stirred mixture was heated, by means of an electrical heating mantle surrounding the flask, to about 76°–79° C. to obtain reflux. Then 58 grams (1 mole) of allyl alcohol were added in small increments over a period of about 2 hours, and refluxing, at a temperature of about 74°–77 C., was continued for 6 additional hours. The reaction mixture was then cooled to about room temperature and filtered to remove solid residues therefrom, and the filtrate was given a water wash. Using a flash evaporator, the filtrate was stripped of volatiles, mainly carbon tetrachloride, at a temperature of 70°–78° C. and a pressure of 15 m.m. of mercury. This was followed by a final stripping at room temperature and a pressure of 0.5 m.m. of mercury. The weight of the stripped product, or weight conversion, was found to be 212 grams, and by vapor phase chromatography it was found to be 84.3 percent pure TCBA. Based on this, the conversion of allyl alcohol was calculated to be 100 percent and the yield (conversion times purity) was determined to be 84.3 percent.

EXAMPLE 2

The identical procedure of Example 1 was employed except that 5.2 grams of the anti-oxidant tertiary butyl hydroxyanisole were also included in the reaction mixture. The stripped product was analyzed by vapor phase chromatography and found to contain 86.8 percent pure TCBA. The yield was determined to be the same, based on a calculated conversion of approximately 100 percent. Thus a slightly higher yield is obtained when an anti-oxidant is included as part of the catalyst mixture.

COMPARATIVE TEST 1

This test is provided to show that when the azobisisobutyronitrile is used as a catalyst in the absence of iron powder and ferric chloride, the conversion to TCBA is very low.

The identical procedure of Example 1 was followed except that no iron powder and no ferric chloride were included in the reaction mixture. Based on the initial weight of allyl alcohol charged, the conversion to allyl alcohol in the reaction product was calculated to be only 7.6 percent. Thus when no iron-ferric chloride is included in the catalyst mixture, along with the azobisisobutyronitrile, inadequate conversion is obtained.

COMPARATIVE TEST 2

The identical procedure of Example 1 was employed except that no azobisisobutyronitrile was included in the reaction mixture. The conversion was found to be 90 percent and the yield, 78.4 percent. Thus a lower yield is obtained when the azobisisobutyronitrile is excluded as a component of the catalyst mixture of the invention.

What is claimed is:

1. In the process of preparing 2,4,4,4-tetrachlorobutanol by reacting allyl alcohol with carbon tetrachloride in the presence of a catalyst, the improvement which comprises employing as said catalyst, a catalytic proportion of a mixture consisting essentially of about 1–60 percent by weight of iron powder, about 0.5–60 percent by weight of iron chloride, about 1–75 percent by weight of azobisisobutyronitrile, and about 1-75 percent by weight of calcium carbonate and wherein an antioxidant selected from the group consisting of butylated hydroxyanisole, butylated hydroxytoluene and 2,2-methylene-bis-4-methyl-6-tertiary-butylphenol can be optionally present in amounts of from about 0.5-20 percent by weight based on the total weight of the catalyst mixture.

2. The process of claim 8 wherein the proportion of said calcium carbonate in said mixture is about 10-40 percent by weight.

3. The process of claim 1 wherein said catalytic proportion ranges from about 0.5 percent to about 25 percent by weight of the total weight of said allyl alcohol and said carbon tetrachloride.

4. The process of claim 3 wherein said iron chloride is anhydrous ferric chloride.

5. The process of claim 4 wherein said mixture also comprises about 0.5-20 percent by weight of said anti-oxidant.

6. The process of claim 4 wherein said mixture is comprised of about 10-40 percent by weight of said iron powder, about 5-40 percent by weight of said ferric chloride, and about 10-60 percent by weight of said azobisisobutyronitrile.

7. The process of claim 6 wherein said catalytic proportion ranges from about 1 percent to about 10 percent of the total weight of said allyl alcohol and said carbon tetrachloride.

8. The process of claim 7 wherein said mixture also comprises about 1-10 percent of said anti-oxidant.

9. The process of claim 2 wherein said reaction is carried out under reflux and under a nitrogen blanket.

10. The process of claim 9 wherein said anti-oxidant is butyl hydroxyanisole.

* * * * *